(12) United States Patent
Muntz

(10) Patent No.: US 7,321,981 B1
(45) Date of Patent: Jan. 22, 2008

(54) MULTI-PORT LINE CARD REDUNDANCY TECHNIQUE FOR AN INTERMEDIATE NETWORK NODE

(75) Inventor: Gary S. Muntz, Lexington, MA (US)

(73) Assignee: Cisco Technology, Inc., San Jose, CA (US)

( * ) Notice: Subject to any disclaimer, the term of this patent is extended or adjusted under 35 U.S.C. 154(b) by 837 days.

(21) Appl. No.: 09/796,046

(22) Filed: Feb. 28, 2001

(51) Int. Cl.
*G06F 11/00* (2006.01)

(52) U.S. Cl. .............................. 714/4; 714/11; 370/216

(58) Field of Classification Search ................ 714/4, 714/11; 370/216, 227, 228
See application file for complete search history.

(56) References Cited

U.S. PATENT DOCUMENTS

| | | | |
|---|---|---|---|
| 5,596,569 A * | 1/1997 | Madonna et al. ........... 370/217 |
| 5,751,710 A | 5/1998 | Crowther et al. | |
| 5,793,746 A * | 8/1998 | Gerstel et al. ............... 370/228 |
| 5,901,024 A * | 5/1999 | Deschaine et al. ............ 361/67 |
| 5,923,643 A * | 7/1999 | Higgins et al. ............. 370/218 |
| 6,118,779 A * | 9/2000 | Madonna .................... 370/353 |
| 6,122,273 A * | 9/2000 | Cantwell et al. ............ 370/359 |
| 6,272,151 B1 | 8/2001 | Gupta et al. | |
| 6,324,185 B1 | 11/2001 | Budhraja | |
| 6,332,198 B1* | 12/2001 | Simons et al. .................. 714/6 |
| 6,359,859 B1* | 3/2002 | Brolin et al. ................ 370/218 |
| 6,594,358 B1* | 7/2003 | George ........................ 379/325 |
| 6,650,803 B1* | 11/2003 | Ramaswami et al. .......... 385/17 |
| 6,654,903 B1* | 11/2003 | Sullivan et al. ................. 714/4 |
| 6,662,211 B1* | 12/2003 | Weller ......................... 709/204 |
| 6,795,393 B1* | 9/2004 | Mazzurco et al. ........... 370/217 |
| 6,801,548 B1* | 10/2004 | Duschatko et al. ......... 370/537 |
| 2005/0094553 A1* | 5/2005 | Zhou et al. .................. 370/217 |

OTHER PUBLICATIONS

U.S. Appl. No. 09/796,047, W. Brandt et al.
Synchronous Optical Network (SONET) Transport Systems: Common Generic Criteria; GR-253-CORE, pp. 5-16-5-20; Issue 2, Dec. 1995 with Revision 2, Jan. 1999.
U.S. Appl. No. 09/791,063, filed Feb. 22, 2001, Rachepalli et al.
U.S. Appl. No. 09/791,062, filed Feb. 22, 2001, Muntz.

* cited by examiner

*Primary Examiner*—Robert Beaucoliel
*Assistant Examiner*—Marc Duncan
(74) *Attorney, Agent, or Firm*—Cesari and McKenna LLP

(57) ABSTRACT

A multi-port line card redundancy technique automatically reconfigures ports on line cards of an intermediate network node, such as an aggregation router, in the event of a failure to one of the ports. The technique includes a circuit that automatically enables one of a pair of line cards to assume responsibility for transmission and reception of data in the event of a failure to one of the ports of a line card. Each line card is preferably a multi-port line card having a plurality of ports. The line cards are preferably further organized and arranged into redundant pairs. The redundancy technique is preferably directed to "1+1" redundancy wherein an external device, such as an end station, transmits identical data over two connections to the redundant line cards of the router.

20 Claims, 8 Drawing Sheets

MULTI-PORT LINE CARD REDUNDANCY TECHNIQUE FOR AN INTERMEDIATE NETWORK NODE

CROSS-REFERENCE TO RELATED APPLICATIONS

The present invention is related to the following co-pending and commonly as-signed U.S. patent application Ser. No. 09/796,047 filed on Feb. 28, 2001 titled, Automatic Protection Switching Line Card Redundancy within an Intermediate Network Node, which was filed on even date herewith and assigned to the assignee of the present invention.

FIELD OF THE INVENTION

The present invention relates to communication networks, and in particular, to redundancy within an intermediate node, such as an aggregation router of a communications network, such as a computer network.

BACKGROUND OF THE INVENTION

A computer network is a geographically distributed collection of interconnected communication links and segments for transporting data between nodes, such as computers. Many types of network segments are available, with the types ranging from local area networks (LAN) to wide area networks (WAN). For example, the LAN may typically connect personal computers and workstations over dedicated, private communications links, whereas the WAN may connect large numbers of nodes over long-distance communications links, such as common carrier telephone lines. The Internet is an example of a WAN that connects disparate networks throughout the world, providing global communication between nodes on various networks. The nodes typically communicate over the network by exchanging discrete frames or packets of data according to predefined protocols. In this context, a protocol consists of a set of rules defining how the nodes interact with each other.

Computer networks may be further interconnected by an intermediate network node, such as a router, having a plurality of ports that may be coupled to the networks. To interconnect dispersed computer networks and/or provide Internet connectivity, many organizations rely on the infrastructure and facilities of Internet Service Providers (ISPs). ISPs typically own one or more backbone networks that are configured to provide high-speed connection to the Internet. To interconnect private networks that are geographically diverse, an organization may subscribe to one or more ISPs and couple each of its private networks to the ISPs equipment. Here, the router may be utilized to interconnect a plurality of private networks or subscribers to an IP "backbone" network. Routers typically operate at the network layer of a communications protocol stack, such as the internetwork layer of the Transmission Control Protocol/Internet Protocol (TCP/IP) communications architecture.

Simple networks may be constructed using general-purpose routers interconnected by links owned or leased by ISPs. As networks become more complex with greater numbers of elements, additional structure may be required. In a complex network, structure can be imposed on routers by assigning specific jobs to particular routers. A common approach for ISP networks is to divide assignments among access routers and backbone routers. An access router provides individual subscribers access to the network by way of large numbers of relatively low-speed ports connected to the subscribers. Backbone routers, on the other hand, provide transports to Internet backbones and are configured to provide high forwarding rates on fast interfaces. ISPs may impose further physical structure on their networks by organizing them into points of presence (POP). An ISP network usually consists of a number of POPs, each of which comprises a physical location wherein a set of access and backbone routers is located.

As Internet traffic increases, the demand for access routers to handle increased density and backbone routers to handle greater throughput becomes more important. In this context, increased density denotes a greater number of subscriber ports that can be terminated on a single router. Such requirements can be met most efficiently with platforms designed for specific applications. An example of such a specifically designed platform is an aggregation router. The aggregation router, or "aggregator", is an access router configured to provide high quality of service (QoS) and guaranteed bandwidth for both data and voice traffic destined for the Internet. The aggregator also provides a high degree of security for such traffic. These functions are considered "high-touch" features that necessitate substantial processing of the traffic by the router.

More notably, the aggregator is configured to accommodate increased density by aggregating a large number of leased lines from ISP subscribers onto a few trunk lines coupled to an Internet backbone. Increased density has a number of advantages for an ISP, including conservation of floor space, simplified network management and improved statistical performance of the network. Real estate (i.e., floor space) in a POP is typically expensive and costs associated with floor space may be lowered by reducing the number of racks needed to terminate a large number of subscriber connections. Network management may be simplified by deploying a smaller number of larger routers. Moreover, larger numbers of interfaces on the access router improve the statistical performance of a network. Packet networks are usually designed to take advantage of statistical multiplexing, capitalizing on the fact that not all links are busy all of the time. The use of larger numbers of interfaces reduces the chances that a "fluke" burst of traffic from many sources at once will cause temporary network congestion.

In addition to deployment at a POP, the aggregator may be deployed in a telephone company central office. The large numbers of subscribers connected to input interface ports of the aggregator are typically small to medium sized businesses that conduct a substantial portion of their operations "on-line", e.g., over the Internet. Each of these subscribers may connect to the aggregator over a high reliability link connection that is typically leased from, e.g., a telephone company provider. The subscriber traffic received at the input interfaces is funneled onto at least one trunk interface. That is, the aggregator essentially functions as a large "fan-in" device wherein a plurality (e.g., thousands) of relatively low-speed subscriber input links is aggregated onto a single, high-speed output trunk to a backbone network of the Internet.

Redundancy techniques are used to protect against failures within an intermediate network node such as an aggregation router. Here, the failures may be directed to an input and/or output interface of the router or to the link connection (such as a fiber optic cable) coupled to the router. The interfaces may be embodied as multiple ports contained on a line card of the aggregator. In an implementation of multi-port line card redundancy, a plurality of external devices (such as end stations) is coupled to each line card via a link connection, such as a fiber cable.

Typically, if one of the redundant line cards fails (breaks), then a "switch over" operation is performed to allow the other line card to transmit and receive data to and from the end stations. Similarly, if a fiber cable connection coupling one of the line cards to an end station fails, thereby resulting in a failure of that line card, then the switch over operation allows the other line card to assume transmission and reception responsibility. However, a difficult situation is presented if one fiber cable coupling a first line card to a first end station fails, while substantially simultaneously a second fiber connection coupling a second line card of the redundant pair to a second end station fails. Here, the aggregation router cannot perform a switch over operation to switch from one line card to the other even though identical copies of data are presented from the end stations to each line card. This is because there are failures associated with different ports that are receiving different data from different end stations.

A conventional approach to this problem is to repair the failed fiber connection at one of the line cards to thereby enable that line card to assume transmission and reception responsibility for the router. However, many installations such as those at a telephone central office or a POP of an ISP have large amounts of cables (fiber or copper) connected to the line cards of the aggregator. These installations tend to "lash down" bundles of the cables to secure them in the event of a natural disaster such as, e.g., an earthquake. As a result, it is quite difficult to remove a fiber or copper cable connection that is tied down to various structures in such a natural disaster resistant manner. In the case of a fiber connection, the glass encompassing the fiber is quite fragile and prone to destruction in the event of excessive handling. This is a serious problem and the present invention is directed to providing a solution to this type of problem.

Another solution to the failed fiber connection problem involves disconnecting a functional fiber connection from one of the line cards and inserting it into the failed fiber connection of the other line card of the redundant pair, to thereby realize at least one complete functional line card. However, this approach requires human intervention in the sense that a technician must travel to the site and perform the swapping operation. Moreover, this approach is expensive in terms of time and resource consumption. The present invention is further directed to an efficient technique that enables automatic reconfiguration of a multi-port line card of an aggregation router in the event of a failure.

SUMMARY OF THE INVENTION

The present invention comprises a technique for automatically reconfiguring ports on line cards of an intermediate network node, such as an aggregation router, in the event of a failure to one of the ports. The technique includes a novel circuit that automatically enables one of a pair of line cards to assume responsibility for transmission and reception of data in the event of a failure to one of the ports of a line card. In the illustrative embodiment, each line card is preferably a multi-port line card having a plurality of ports. The line cards are preferably further organized and arranged into redundant pairs. The novel technique is directed to "1+1" redundancy wherein an external device, such as an end station, transmits identical data over two connections to the redundant line cards of the router.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
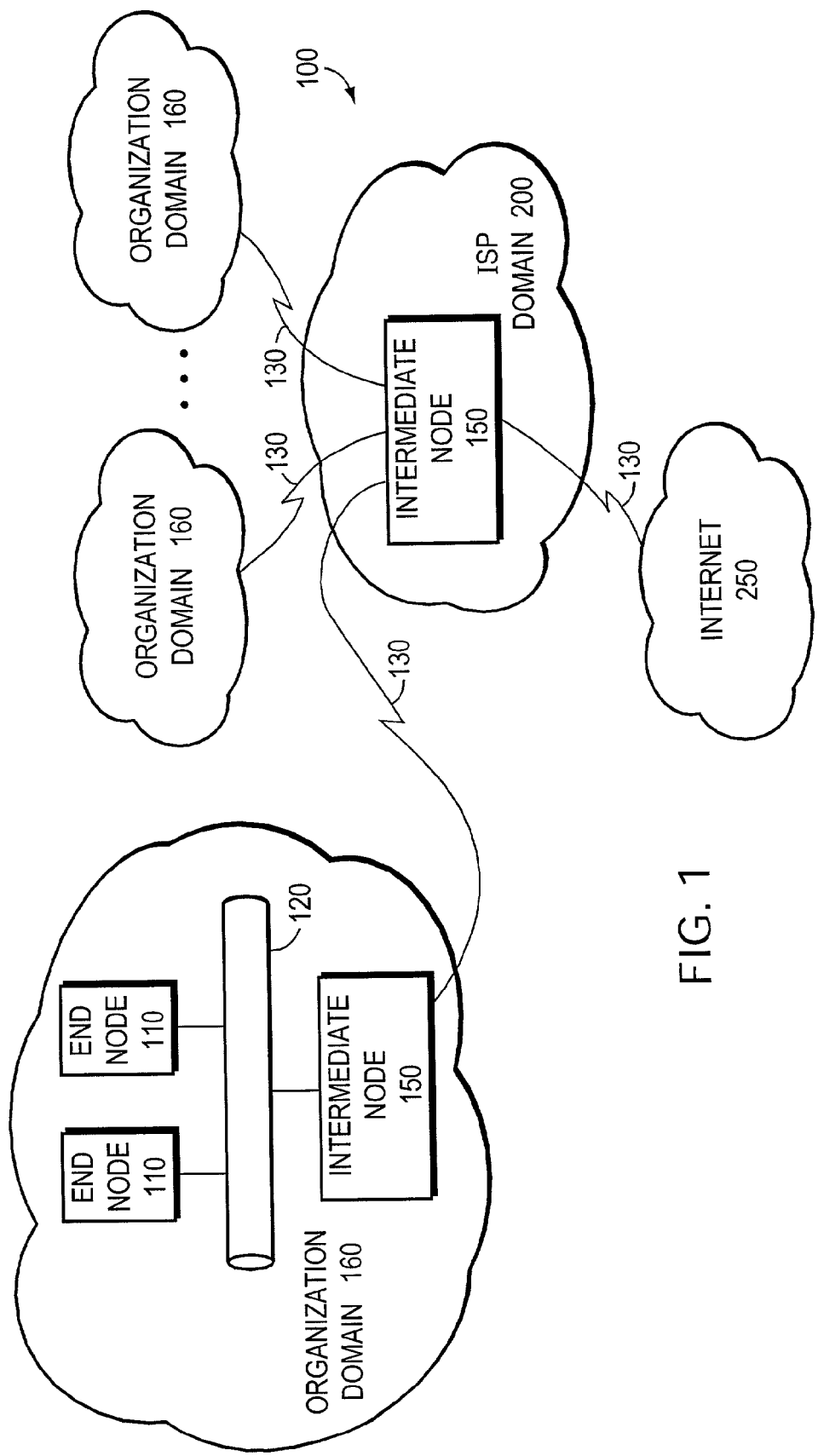
FIG. 1 is a schematic block diagram of a network including a collection of communication links and segments organized into a plurality of subscriber domains coupled to an Internet service provider (ISP) domain.

FIG. 1 is a schematic block diagram of a computer network 100 comprising a collection of communication links and segments connected to a plurality of nodes, such as end nodes 110 and intermediate nodes 150. The network links and segments may comprise-local area networks (LANs) 120 and wide area network (WAN) links 130 interconnected by intermediate nodes 150, such as network switches or routers, to form an internetwork of computer nodes. These internetworked nodes communicate by exchanging data packets according to a predefined set of protocols, such as the Transmission Control Protocol/Internet Protocol (TCP/IP). It should be noted that other techniques/protocols, such as the Hypertext Transfer Protocol (HTTP), may be advantageously used with the present invention.

Figure 2:
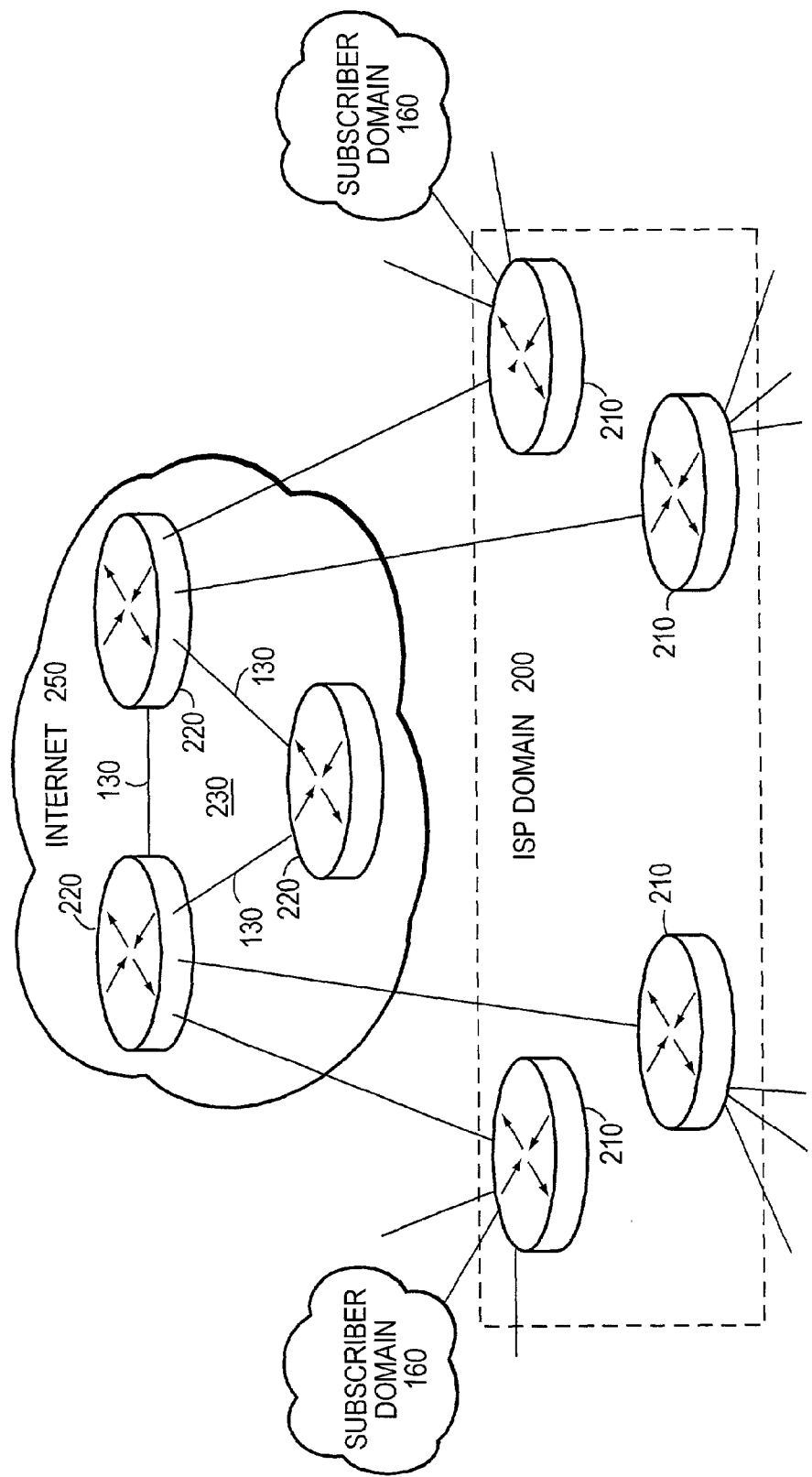
FIG. 2 is a schematic block diagram of an ISP domain comprising a plurality of interconnected access and backbone routers.

To interconnect their dispersed private computer networks and/or provide Internet connectivity, many organizations rely on the infrastructure and facilities of Internet service providers (ISPs) rather than purchase and configure the necessary equipment themselves. In the illustrative embodiment, the computer network 100 is organized into a plurality of domains, including organization domains 160 of private networks coupled to an ISP domain 200. An organization 160 may subscribe to one or more ISPs 200 and couple each of its private networks to the ISP's equipment. FIG. 2 is a schematic block diagram of an ISP domain 200 comprising a plurality of interconnected access and backbone routers 210, 220. The access routers 210 connect the individual organization or subscriber domains 160 to the backbone routers 220 via relatively low-speed ports connected to the subscribers. The backbone routers 220 are interconnected by WAN links 130 to form one or more backbone networks 230 configured to provide high-speed, high-capacity, wide area connectivity to the Internet, represented herein as Internet cloud 250.

Figure 3:
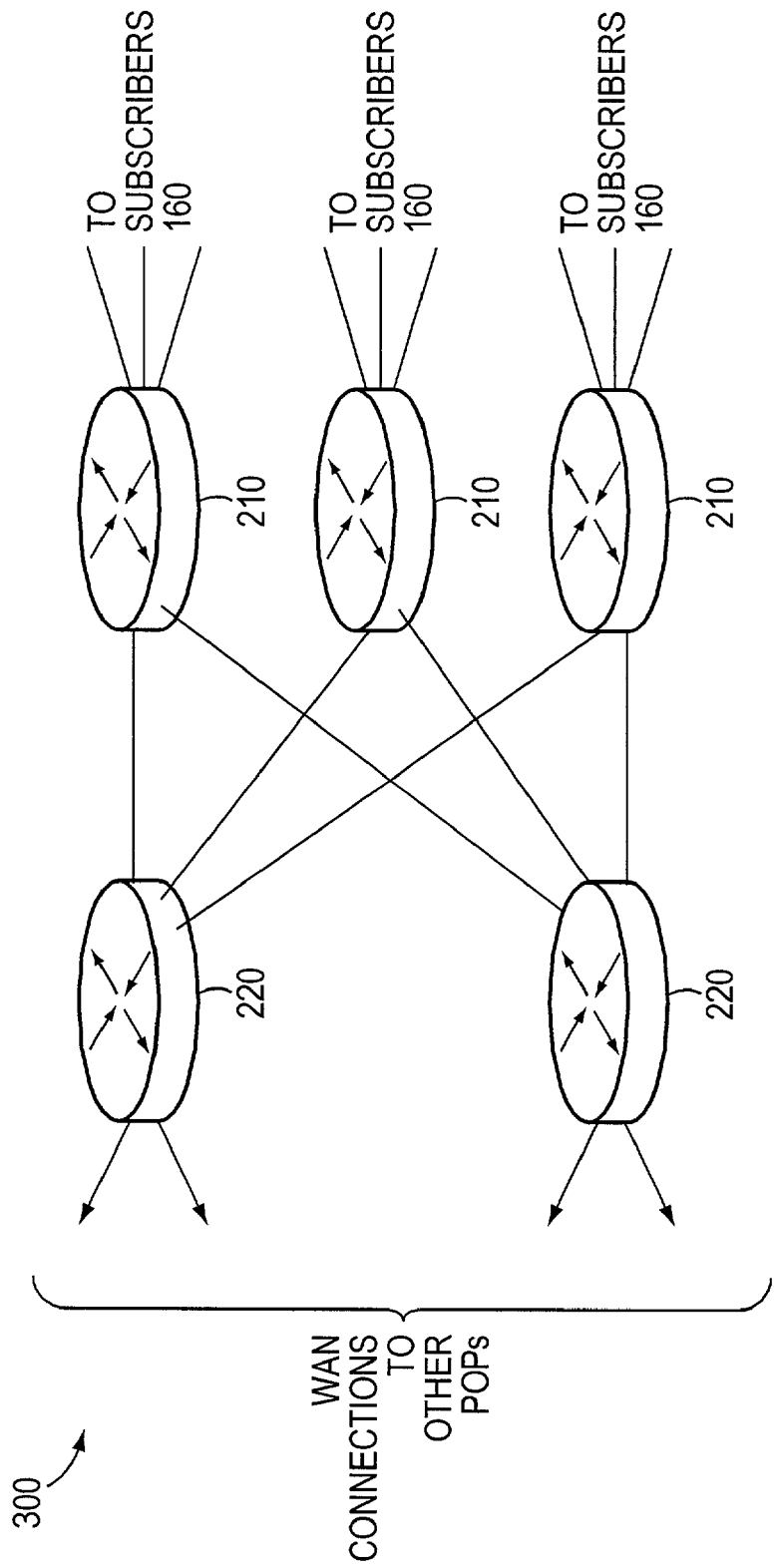
FIG. 3 is a schematic block diagram of an illustrative embodiment of an ISP point of presence (POP) that may be advantageously used with the present invention.

An ISP domain 200 may be further organized into points of presence (POP), each of which comprises a physical location wherein a set of access and backbone routers is located. FIG. 3 is a schematic block diagram of an illustrative embodiment of a POP 300 that may be advantageously used with the present invention. The POP 300 comprises a plurality of backbone routers 220 coupled to access routers 210 equipped with redundant trunk connections. The use of more than one backbone router enhances network availability, as does the use of redundant trunk connections on the access routers. The backbone routers 220 and access routers 210 are maintained separately so that backbone router configuration can be kept relatively stable over time. Backbone routers are not affected when individual subscribers add or remove value-added services or when individual subscribers are added to or removed from the access routers 210. In addition, access routers can be added as new subscribers are brought onto the network.

In general, the access router 210 serves as a "front line" for an ISP 200, connecting directly to routers on the subscribers' premises. However, there is usually a complex circuit-switched infrastructure that transports, e.g., a leased line signal a "last mile" between the subscriber premises and the POP 300. There are many ways of constructing the last-mile network; one technique for new installations is based on metropolitan-area fiber-optic ring technology. These fiber-optic network installations may be based on Synchronous Optical Network (SONET) or Synchronous Digital Hierarchy (SDH) standards. SONET/SDH technology is desirable in transport networks that provide leased line connectivity to subscriber routers because of the high capacity of fiber-optic cables and the high-density, industry-wide standard interface between network transport equipment and the equipment that uses the transported signals, such as aggregation routers.

Figure 4:
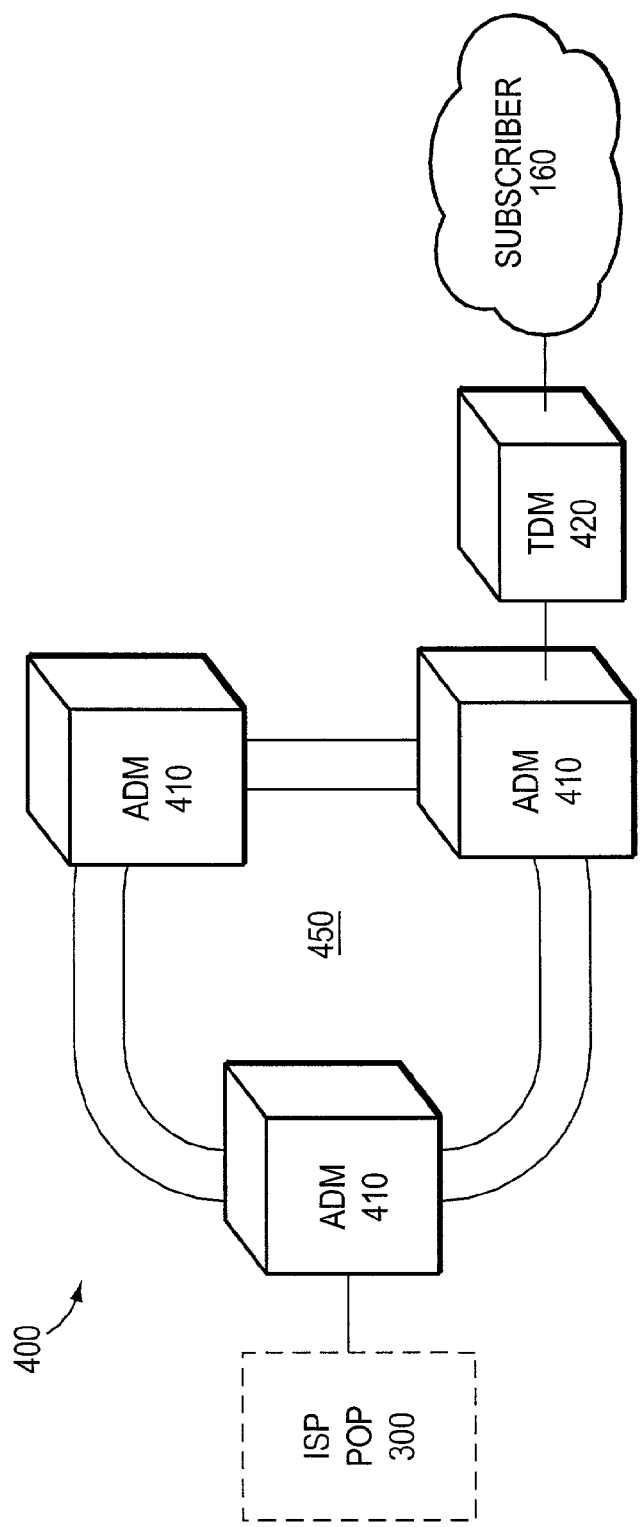
FIG. 4 is a schematic block diagram of a Synchronous Optical Network (SONET) metropolitan-area transport network that may be advantageously used with the present invention.

FIG. 4 is a schematic block diagram of a SONET metropolitan-area transport network 400 that may be advantageously used with the present invention. The SONET network 400 transports 1.544-Mbps DS1 and 44.736-Mbps DS3 signals from a subscriber site 160 across a fiber-optic ring 450 to an ISP POP 300. To that end, the SONET network 400 comprises a TDM device 420 configured to multiplex a plurality of (e.g., 28) DS1 circuits to fill a DS3 circuit. In addition, the network 400 comprises a plurality of add drop multiplexers (ADMs 410) configured to "drop-off" either DS1 or DS3 circuits onto, e.g., an OC-48 SONET fiber.

As Internet traffic increases, the demand for access routers 210 to handle increased density, and backbone routers 220 to handle greater throughput, becomes more important. Increased density denotes a greater number of subscriber ports that can be terminated on a single access router. An aggregation router is an access router configured to accommodate increased density by aggregating a large number of leased lines from ISP subscribers onto a few trunk lines coupled to an Internet backbone. That is, the aggregator essentially functions as a large "fan-in" device wherein a plurality of relatively low-speed subscriber input links is aggregated onto at least one high-speed output trunk to a backbone network of the Internet.

Figure 5:
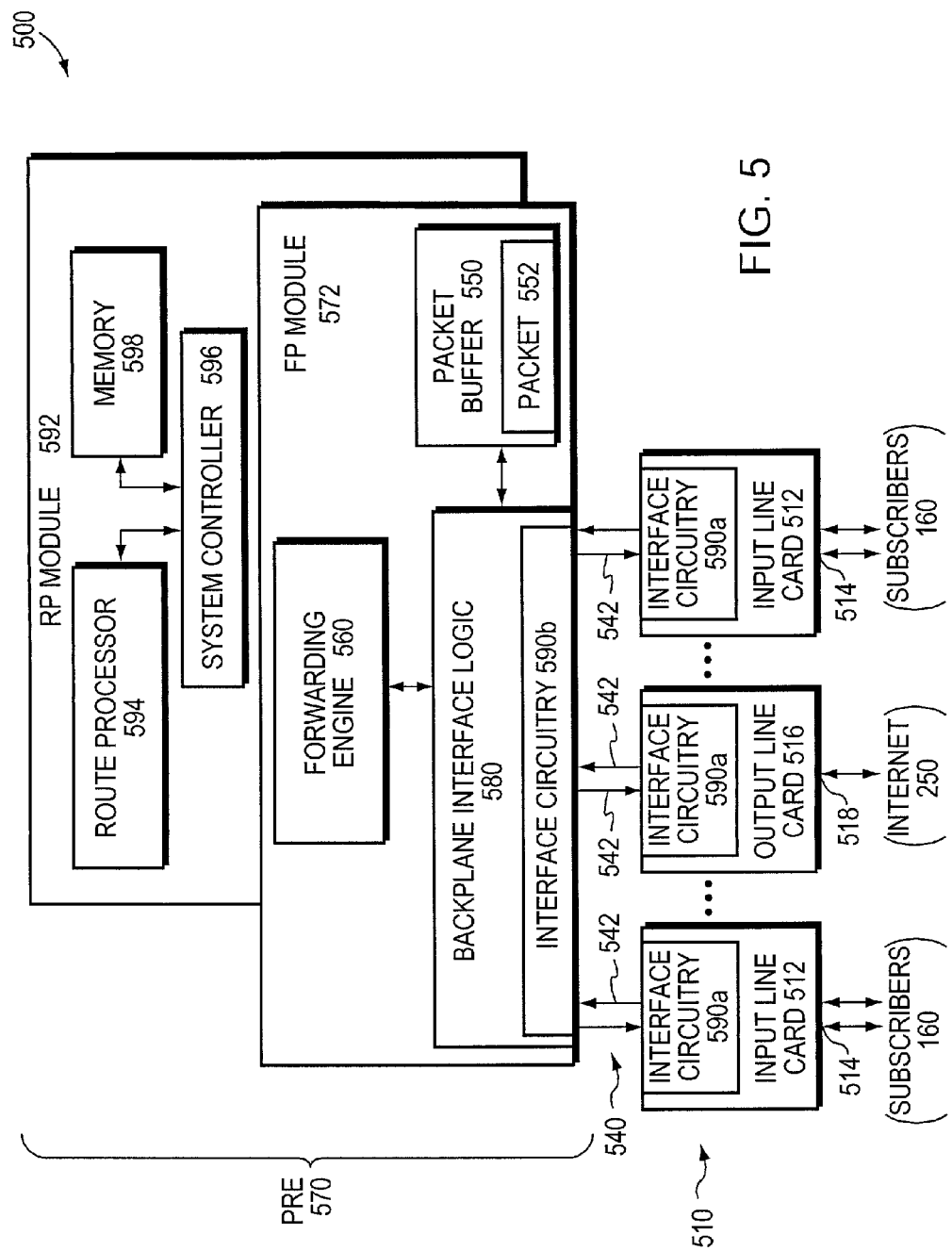
FIG. 5 is a schematic block diagram of an aggregation router having a backplane adapted to receive a plurality of line cards in accordance with the present invention.

FIG. 5 is a schematic block diagram of an aggregation router 500 in accordance with the present invention. The aggregation router ("aggregator") comprises a plurality of line cards 510 coupled to at least one performance routing engine (PRE 570) via a unidirectional (i.e., point-to-point) interconnect system 540. The line cards 510 include a plurality of input cards 512 having input ports 514 coupled to subscribers 160 and at least one output "trunk" card 516 configured to aggregate the subscriber inputs over at least one output port 518. The PRE 570 is an assembly comprising a fast packet "forwarding" processor (FP) module 572 and a route processor (RP) module 592 adapted to perform packet forwarding and routing operations, respectively. The FP and RP modules are preferably interconnected in a "mezzanine" arrangement to form the PRE 570. The PRE assembly also provides quality of service (QoS) functions for complete packets received from each input line card over the interconnect system.

To that end, the interconnect system 540 comprises a plurality of high-speed unidirectional (i.e., point-to-point) links 542 coupling the PRE to each line card 510. The links are preferably clock forwarded links such that each unidirectional link comprises a "narrow" connection of two data "wire pairs" for transporting the data signals and one clock wire pair for carrying clock signals. However, it will be understood to those skilled in the art that the clock forwarding technique may scale to accommodate other clock forwarding arrangements such as, e.g., a "wide" connection comprising four data signals for each accompanying clock signal.

The RP module 592 is a processor-based, routing system suite comprising functionality incorporated within a typical router. That is, the RP module comprises a general-purpose processor 594 (e.g., a MIPS route processor) coupled to a system controller 596 and memory 598. The memory 598 comprises synchronous dynamic random access memory (SDRAM) storage locations addressable by the processor 594 for storing software programs and data structures accessed by the components. A network routing operating system, portions of which are typically resident in memory and executed by the route processor, functionally organizes the router by, inter alia, invoking network operations in support of software processes executing on the router. The route processor 594 is configured to construct and load routing tables used by the FP module 572. The processor 594 also performs configuration management functions of the aggregation router 500 and communicates with neighboring peer routers to exchange protocol data units used to construct the routing tables in accordance with conventional routing algorithms. It will be apparent to those skilled in the art that other memory means, including various computer readable media, may be used for storing and executing program instructions pertaining to the operation of the router.

In the illustrative embodiment, the aggregator 500 includes sixteen (16) line cards 510, each of which is configured for an OC-12, i.e., 622 megabits per second (Mbps), data rate. Thus, the point-to-point links 542 coupled to the line cards must be capable of supporting such data rates. Accordingly, an interconnect protocol is provided that enables encoding of packets over the point-to-point links 542 of the interconnect system to thereby limit the bandwidth consumed by overhead when transmitting the packets within the aggregation router. An example of an interconnect protocol that may be advantageously used with the present invention is disclosed in co-pending and commonly-owned U.S. patent application Ser. No. 09/791,062 filed on Feb. 22, 2001 titled High Performance Protocol for an Interconnect System of an Intermediate Network Node, which application is hereby incorporated by reference as though fully set forth herein.

Interface circuitry 590 coupled to the ends of the unidirectional links 542 is resident on both the line cards 510 and a backplane logic circuit 580 of the PRE 570. The backplane logic circuit 580 is preferably embodied as a high performance, application specific integrated circuit (ASIC), hereinafter referred to as the Cobalt ASIC, which is configured to further interface the line cards to a packet buffer 550 and a forwarding engine 560 of the FP module 572. The packet buffer 550 is a memory used to store packets 552 as the forwarding engine 560 determines where and when they should be forwarded within the aggregator. For example, the packet buffer may be used to store low priority data packets while high priority, low latency voice packets are forwarded by the forwarding engine to an output card (e.g., the trunk card 516) of the aggregator. An example of a backplane logic circuit that may be advantageously used with the present invention is disclosed in co-pending and commonly-owned U.S. patent application Ser. No. 09/791,063 filed on Feb. 22, 2001 titled High Performance Interface Logic Architecture of an Intermediate Network Node, which application is hereby incorporated by reference as though fully set forth herein.

The interface circuitry 590 includes interconnect ports coupled to the point-to-point links 542 of the interconnect system 540 and implements a unidirectional, point-to-point clock forwarding technique that is configured for direct ASIC-to-ASIC transmission over a backplane of the aggregation router. As a result, the interface circuitry 590a resident on the line cards 510 is preferably embodied within a high-performance ASIC, hereinafter referred to as the Barium ASIC, whereas the interface circuitry 590b is resident on the Cobalt ASIC. The interface circuitry generally functions as a translator that converts conventional formats of data received at the line cards 510 to a novel protocol format for transmission from, e.g., the Barium ASIC over the interconnect system 540 to the Cobalt ASIC. The ASICs also include circuitry to perform cyclic redundancy code (CRC) generation and checking on packets, along with interconnect format checking.

Broadly stated, the backplane of the aggregator supports independent "half-slot" line cards, each capable of delivering up to OC-12 bandwidth using a narrow connection (e.g., each of the two data signals per half slot operating at 400 Mb/s). Alternatively, a pair of backplane connectors may be attached to one "full-slot" line card. A full slot card may connect just one of the connectors to its interface circuitry, in which case it is functionally identical to a half-slot card, or may use both in "bound" mode for double bandwidth.

Figure 6:
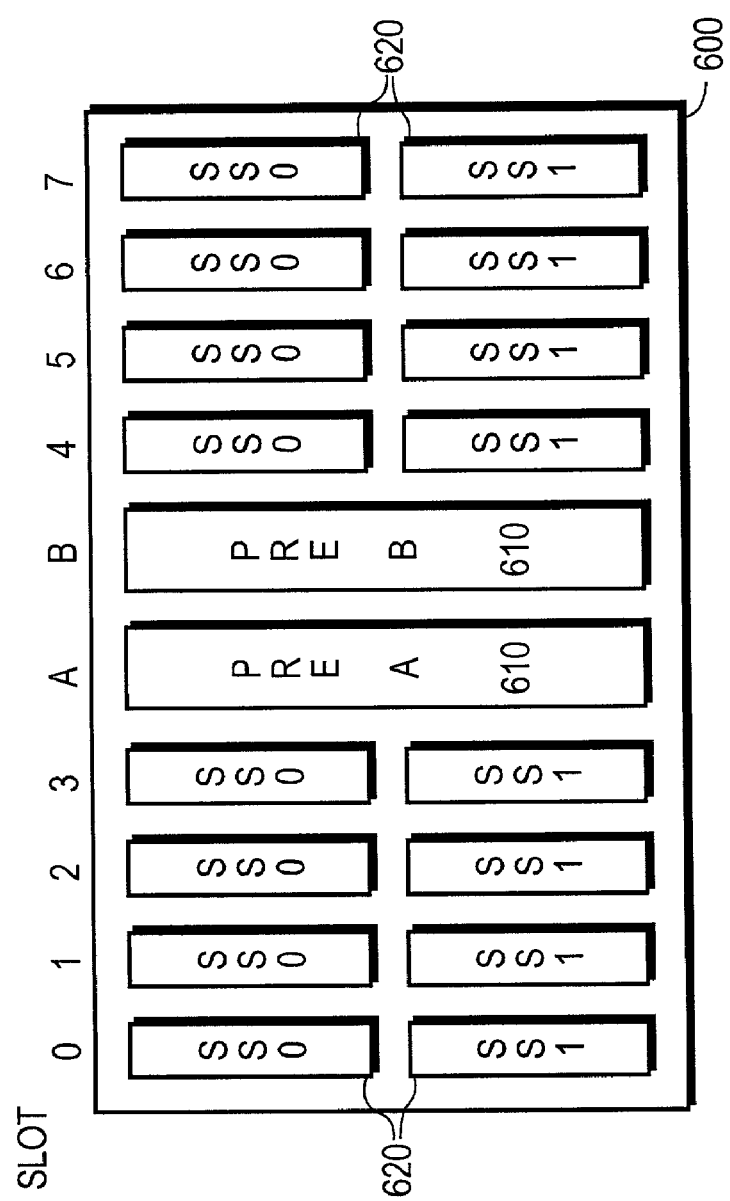
FIG. 6 is a schematic block diagram of an illustrative embodiment of the backplane of the present invention.

FIG. 6 is a schematic block diagram of an illustrative embodiment of the backplane 600 of the aggregation router 500. The backplane 600 includes two central, full slots 610, each having a connector configured to accommodate (receive) a PRE module assembly. In particular, these central slot connectors are used to accommodate redundant PRE assemblies PRE-A and PRE-B. The backplane is organized such that there are eight (8) adjacent slots (four on each side of the redundant central PRE slots) with each adjacent slot having two (2) subslots (SS0, SS1). Thus, the backplane illustratively comprises sixteen (16) half slots 620, each of which includes a connector configured to accommodate a half-slot height (i.e., half-height) line card. In addition to supporting half-height line cards, the backplane 600 may support full-slot height (i.e., full-height) line cards that span both subslots of a slot and that may include either one or two connectors adapted for insertion into the connectors of the subslots of the slot.

In the illustrative embodiment, all line cards are full-height line cards for a total of 8 line cards in the aggregation router. However, in an alternate embodiment, the backplane 600 can further support 16 half-height cards or any mixture of full-height and half-height cards. Each half-slot connector 620 of the backplane can support OC-12 line cards, whose bandwidths conform to a trunk interface card 516 of the aggregator. Notably, the trunk card can be inserted into any of the symmetrical half-slots on the backplane; that is, there is no dedicated slot for the trunk line card 516 in the router platform. Advantageously, the platform can support a variety of subscriber line cards, each having different data bandwidth and formats, such as T1, T3, OC-3 and/or SDH1 (the European equivalent of OC-3).

Figure 7:
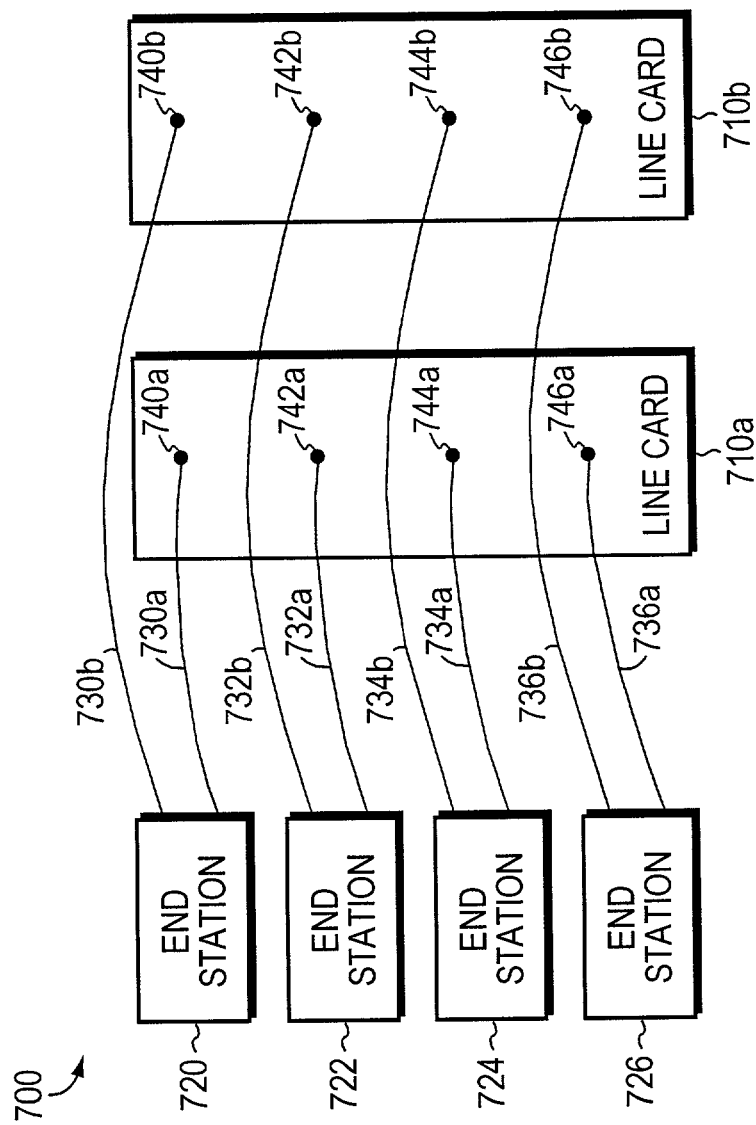
FIG. 7 is a schematic block diagram of an illustrative embodiment of a multi-port line card redundancy technique in accordance with the present invention.

Redundancy techniques are used to protect against failures directed to an input and/or output interface of the aggregator or to the link connection (such as a fiber optic cable) coupled to the aggregator. The interfaces may be embodied as multiple ports contained on a line card of the aggregator. In an implementation of multi-port line card redundancy, a plurality of external devices (such as end stations) is coupled to each line card via a link connection, such as a fiber cable. FIG. 7 is a schematic block diagram of an illustrative embodiment 700 of a multi-port line card redundancy technique wherein a redundant pair of line cards of aggregator 500 is coupled to four (4) end stations 720–726 by way of cable connections 730a,b–736a,b. An example of line cards that may be advantageously used in the illustrative implementation is optical line cards 710a,b, each having four (4) ports 740a,b–746a,b adapted for operation with the aggregator 500. Although the invention will be described with respect to optical ports on the line card, it will be understood to those skilled in the art that other type of ports, such as electrical ports, may be used in accordance with the principals of the present invention.

The multi-port redundancy technique described herein is invoked to essentially reconfigure (i.e., "switch over") a failed port associated with a line card of the redundant pair of line cards to the corresponding port of the complimentary line card of that pair. This technique enables the line cards to conform to automatic protection switching (APS) line card redundancy. An example of an APS line card redundancy technique that may be advantageously used with the present invention is disclosed in co-pending and commonly-owned U.S. patent application Ser. No. 09/796,047 filed on Feb. 28, 2001 titled Automatic Protection Switching Line Card Redundancy within an Intermediate Network Node, which application is hereby incorporated by reference as though fully set forth herein.

In the illustrative embodiment described herein, the aggregator may be configured for APS redundancy of the line cards to accommodate failures to either the line cards or the transmission facility carrying trunk traffic to upstream equipment. SONET APS is defined by Telcordia GR-253-CORE and ANSI T1.105.01 and supports fast recovery from fiber or equipment failures in a SONET network. The novel multi-port line card redundancy technique is preferably used in SONET networking environment 400 in connection with end stations 720–726, an example of which is preferably ADM 410 (FIG. 4). As noted, each of a pair of redundant line cards 710a,b (preferably configured as SONET/SDH optical line cards) is coupled to an ADM via separate fiber (e.g., OC-12) connections 730a,b–736a,b.

Figure 8:
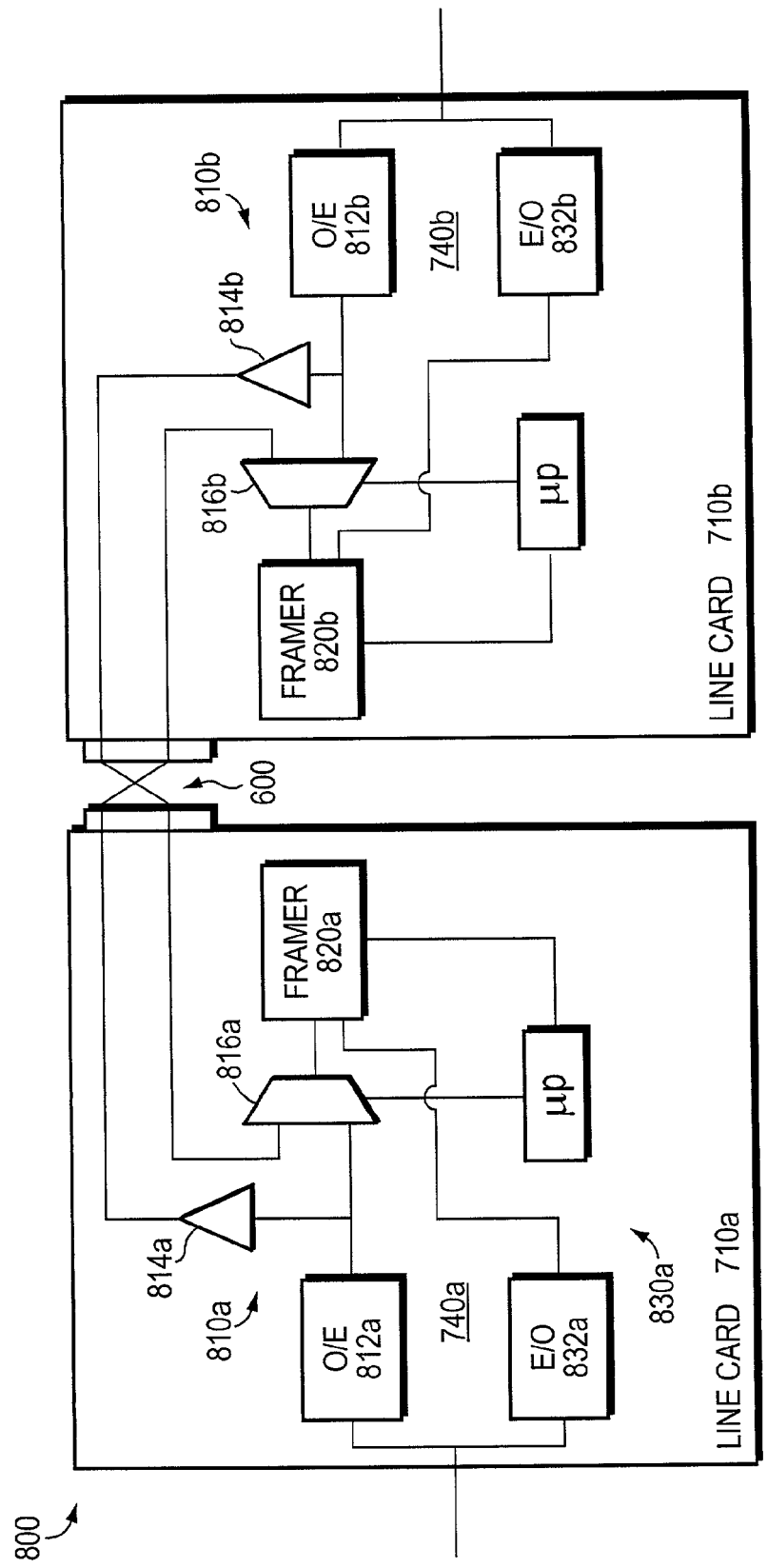
FIG. 8 is a schematic block diagram of an alias logic circuit in accordance with the present invention.

FIG. 8 is a schematic block diagram of a multi-port, line card redundancy circuit 800 in accordance with the present invention. The circuit 800 is preferably associated with each optical port 740a,b–746a,b of the multi-port line cards

710a,b. Each optical port 740–746 includes receiver circuitry adapted to receive data over a respective fiber cable 730–736 and transmitter circuitry adapted to transmit data over the fiber cable. The novel multi-port redundancy circuit 800 is primarily associated with the receiver circuitry of each port. A receive portion 810 of the circuit 800 comprises an optical to electrical (O/E) converter 812 that converts an optical signal received over the optical fiber cable to an electrical signal. The electrical signal is then fed to a framer 820 configured to "frame" and recover valid packet data within a stream of data bytes. That is, the framer 820 is provided at a transmit portion 830 of the circuit 800 to recover packet data (bytes) from a stream of encoded frames transferred within the aggregator 500 and at the receive portion 810 of the circuit to generate the encoded frames.

Specifically, an optical signal received from end station 720 at receive portion 810a of a port, e.g., port 740a, on line card 710a is converted to an electrical signal by O/E converter 812a and fed to the framer 820a on the line card. The electrical signal is is also driven (via a driver 814a) over the backplane 600 to a receive portion 810b of a corresponding port 740b on complimentary line card 710b. That is, the corresponding port on the complimentary line card preferably incorporates an identical copy of the novel circuit 800. Therefore, a converted electrical signal associated with an optical signal received at the receive portion 810b of port 740b on complimentary line card 710b is driven by driver 814b over the backplane 600 to the receive portion 810a of corresponding port 740a on the line card 710a.

A multiplexer 816 is disposed within the path between the O/E converter 812 and the framer 820 on each line card port 740. For example, the multiplexer 816a functions to accommodate the electrical signal received at the optical port 740a of line card 710a in addition to the electrical signal driven over the backplane 600 from the complimentary line card 710b of the redundant pair. The multiplexer 816a is enabled by a microprocessor (μp) located on each line card 710. The microprocessor constantly monitors the "health" of the signal received from the framer 820a and reports that status to the route processor 594. The route processor then instructs the microprocessor to select either the electrical signal received at the local line card or the electrical signal driven over the backplane 600 from the complimentary port associated with the complimentary line card for use by the aggregator. The route processor initially configures line cards 710 of the same type for redundancy.

Upon initialization, the multiplexers 816 are enabled to select data present at their local inputs associated with their local ports for use within the aggregator. Assume a failure occurs with, e.g., a cable 730a coupled to port 740a on the local line card 710a. The route processor 594 receives configuration information from the microprocessor indicating the failure. Since redundancy is enabled, the route processor 594 instructs the microprocessor on the line card 710a experiencing the failure to "switch over" from the failed port 740a to the corresponding port 740b on complimentary line card 710b. In accordance with the multi-port redundancy technique, the microprocessor configures its multiplexer 816a associated with the receiver circuitry for port 740a to select the input signal associated with the corresponding port 740b of the complimentary line card of the redundant pair. In this event, the line card 710a associated with failed port 740a continues running, providing redundancy protection for end stations 722–726.

Assume also that a subsequent failure occurs with, e.g., cable 734b coupled to port 744b on line card 710b. The route processor 594 learns of the failure condition as described above and instructs the microprocessor on line card 710b to configure multiplexer 816b associated with port 744b to select the input signal associated with the corresponding port 744a of the complimentary line card 710a of the redundant pair. Redundant line card operation is resumed as both framers 820a,b associated with ports 744a,b receive data from end station 724 and make that data available to the forwarding engine 560.

In this configuration, line cards 710a,b continue to maintain full redundant operation with end stations 722 and 726, despite two (2) substantially simultaneous fault conditions. Furthermore, end stations 720 and 724 continue service over the "surviving" links 730b and 734a with partial redundancy within the aggregator chassis. In contrast, simple line card APS operating without this invention would have "shut down" one of the line cards, losing all redundancy and further sacrificing connectivity to either end station 720 or 724.

In sum, the inventive technique automatically reconfigures ports on line cards of an intermediate network node, such as an aggregation router, in the event of a failure to one of the ports. The technique includes a novel circuit that automatically enables one of a pair of line cards to assume responsibility for transmission and reception of data in the event of a failure to one of the ports of a line card. As noted, the novel technique is directed to "1+1" redundancy wherein an end station transmits identical data over two connections to the redundant line cards of the router. To that end, the multi-port line card redundancy technique described herein compliments line card APS. That is, the present invention extends the benefits of line card APS to multi-port line card redundancy where "shutting down a line card" would otherwise cause substantial problems for ports and end stations that should be unaffected.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for automatically reconfiguring ports on line cards of an aggregation router in the event of a failure to at least one of the ports, the method comprising the steps of:
    organizing first and second line cards as a redundant pair of line cards, wherein each line card is a multi-port line card having a plurality of ports;
    coupling a first external device to a first port on the first multi-port line card and a corresponding first port on the second multi-port line card over a pair of first connections;
    automatically enabling the first port of the first multi-port line card of the redundant pair to assume responsibility for reception of data from the first external device in the event of a failure to one of the corresponding first port of the second multi-port line card of the redundant pair and its first connection to the first external device; and
    transmitting identical data over the pair of first connections from the first external device to the redundant multi-port line cards of the aggregation router.

2. A method for automatically reconfiguring ports on line cards of an aggregation router in the event of a failure to at least one of the ports, comprising:

organizing first and second line cards as a redundant pair of line cards, wherein each line card is a multi-port line card having a plurality of ports;

coupling a first external device to a first port on the first multi-port line card and a corresponding first port on the second multi-port line card over a pair of first connections;

automatically enabling the first port of the first multi-port line card of the redundant pair to assume responsibility for reception of data from the first external device in the event of a failure to one of the corresponding first port of the second multi-port line card of the redundant pair and its first connection to the first external device;

arranging the multi-port line cards for 1+1 redundancy; and transmitting identical data over the pair of first connections from the first external device to the redundant multi-port line cards of the aggregation router.

3. The method of claim 2 wherein the first external device is an end station of a computer network.

4. The method of claim 1 further comprising the steps of:

providing receiver circuitry for each port, the receiver circuitry adapted to receive data over one of the first connections; and associating a multi-port, line card redundancy circuit with the receiver circuitry of each port.

5. The method of claim 1 wherein the step of automatically enabling comprises the step of associating a multi-port, line card redundancy circuit with each port of the multi-port line cards.

6. The method of claim 5 wherein step of associating comprises the steps of:

driving a data signal received from the first external device over the one of the first connections at the corresponding first port of the second multi-port line card to the first port of the first multi-port line card; and selecting the data signal driven from the corresponding first port for use by the intermediate network node at the first port of the first multi-port line card.

7. A method for automatically reconfiguring ports on line cards of an intermediate network node in the event of a failure to at least one of the ports, comprising:

organizing first and second line cards as a redundant pair of line cards, wherein each line card is a multi-port line card having a plurality of ports;

coupling a first external device to a first port on the first multi-port line card and a corresponding first port on the second multi-port line card over a pair of first connections;

automatically enabling the first port of the first multi-port line card of the redundant pair to assume responsibility for reception of data from the first external device in the event of a failure to one of the corresponding first port of the second multi-port line card of the redundant pair and its first connection to the first external device;

associating a multi-port, line card redundancy circuit with each port of the multi-port line cards;

converting an optical signal received over the one of the first connections at the corresponding first port to an electrical signal;

driving the electrical signal from the corresponding first port of the second multi-port line card to the first port of the first multi-port line card; and selecting the electrical signal from the corresponding first port for use by the intermediate network node at the first port of the first multi-port line card.

8. A method for automatically reconfiguring ports on line cards of an intermediate network node in the event of a failure to at least one of the ports, comprising:

organizing first and second line cards as a redundant pair of line cards, wherein each line card is a multi-port line card having a plurality of ports;

coupling a first external device to a first port on the first multi-port line card and a corresponding first port on the second multi-port line card over a pair of first connections;

automatically enabling the first port of the first multi-port line card of the redundant pair to assume responsibility for reception of data from the first external device in the event of a failure to one of the corresponding first port of the second multi-port line card of the redundant pair and its first connection to the first external device;

coupling a second external device to a second port on the first multi-port line card and a corresponding second port on the second multi-port line card over a pair of second connections; and maintaining full redundant operation with the second external device despite the failure to one of the corresponding first port of the second multi-port line card of the redundant pair and its first connection to the first external device.

9. A method for automatically reconfiguring ports on line cards of an intermediate network node in the event of a failure to at least one of the ports, comprising:

organizing first and second line cards as a redundant pair of line cards, wherein each line card is a multi-port line card having a plurality of ports;

coupling a first external device to a first port on the first multi-port line card and a corresponding first port on the second multi-port line card over a pair of first connections;

automatically enabling the first port of the first multi-port line card of the redundant pair to assume responsibility for reception of data from the first external device in the event of a failure to one of the corresponding first port of the second multi-port line card of the redundant pair and its first connection to the first external device;

coupling a second external device to a second port on the first multi-port line card and a corresponding second port on the second multi-port line card over a pair of second connections;

coupling a third external device to a third port on the first multi-port line card and a corresponding third port on the second multi-port line card over a pair of third connections; and maintaining full redundant operation with the second and third external devices despite the failure to one of the corresponding first port of the second multi-port line card of the redundant pair and its first connection to the first external device.

10. A system adapted to automatically reconfigure ports on line cards of an intermediate node in the event of a failure to one of the ports, the system comprising:

a pair of multi-port line cards organized as first and second line cards of a redundant pair, each line card having a plurality of ports;

an external device connected to a port on the first line card and a corresponding port on the second line card over a pair of connections, the external device configured to transmit identical data over the pair of connections to the redundant multi-port line cards of the node; and a redundancy circuit associated with the port and corresponding port of the redundant pair of line cards, the redundancy circuit configured to automatically enable the corresponding port of the second line card to assume responsibility for reception of data from the external device in the event of a failure to one of the port of the first line card and its connection to the external device, wherein the redundancy circuit comprises a receive portion associated with each port.

11. The system of claim 10 wherein the receive portion comprises:
   a driver adapted to drive data provided by the external device directly to the port of the first line card from the port to the corresponding port of the second line card;
   a multiplexer of the corresponding port, the multiplexer having a first input configured to receive data driven by the driver to the corresponding port and a second input configured to receive data provided by the external device directly to the corresponding port of the second line card; and
   a microprocessor adapted to configure the multiplexer to select the data driven by the driver to the corresponding port in the event of the failure to one of the port of the first line card and its connection to the external device.

12. A system adapted to automatically reconfigure ports on line cards of an intermediate node in the event of a failure to one of the ports, the system comprising:
   a pair of multi-port line cards organized as first and second line cards of a redundant pair, each line card having a plurality of ports;
   an external device connected to a port on the first line card and a corresponding port on the second line card over a pair of connections;
   a redundancy circuit associated with the port and corresponding port of the redundant pair of line cards, the redundancy circuit configured to automatically enable the corresponding port of the second line card to assume responsibility for reception of data from the external device in the event of a failure to one of the port of the first line card and its connection to the external device;
   a receive portion associated with each port;
   a driver in the receive portion adapted to drive data provided by the external device directly to the port of the first line card from the port to the corresponding port of the second line card;
   a multiplexer in the receive portion of the corresponding port, the multiplexer having a first input configured to receive data driven by the driver to the corresponding port and a second input configured to receive data provided by the external device directly to the corresponding port of the second line card;
   a microprocessor adapted to configure the multiplexer to select the data driven by the driver to the corresponding port in the event of the failure to one of the port of the first line card and its connection to the external device;
   a first framer of the first line card, the first framer configured to generate an encoded frame from data provided by the external device, the encoded frame adapted for transfer within the intermediate node; and
   a second framer of the second line card, the second framer configured to generate the encoded frame from the data provided by the external device, the encoded frame adapted for transfer within the intermediate node.

13. A multi-port line card redundancy circuit adapted to automatically reconfigure ports on first and second redundant line cards of a router in the event of a failure to one of the ports, the multi-port line card redundancy circuit comprising:
   a driver adapted to drive data provided by an external device directly to a port of the first redundant line card from the port to a corresponding port of the second redundant line card, where the external device provides identical data to first and second line cards over separate connections;
   a first multiplexer of the corresponding port, the first multiplexer having a first input configured to receive data driven by the driver to the corresponding port and a second input configured to receive data provided by the external device directly to the corresponding port of the second line card; and
   a microprocessor adapted to configure the multiplexer to select the data driven by the driver to the corresponding port in the event of the failure to the port of the first line card.

14. The multi-port line card redundancy circuit of claim 13 wherein the router is an aggregation router and wherein the external device is an end station.

15. A multi-port line card redundancy circuit adapted to automatically reconfigure ports on first and second redundant line cards of a router in the event of a failure to one of the ports, the multi-port line card redundancy circuit comprising:
   a driver adapted to drive data provided by an external device directly to a port of the first redundant line card from the port to a corresponding port of the second redundant line card;
   a first multiplexer of the corresponding port, the first multiplexer having a first input configured to receive data driven by the driver to the corresponding port and a second input configured to receive data provided by the external device directly to the corresponding port of the second line card;
   a microprocessor adapted to configure the multiplexer to select the data driven by the driver to the corresponding port in the event of the failure to the port of the first line card;
   the router is an aggregation router and the external device is an end station; and
   the end station is an add drop multiplexer of a SONET network.

16. Apparatus for automatically reconfiguring ports on line cards of a router in the event of a failure to at least one of the ports, the apparatus comprising:
   means for organizing first and second line cards as a redundant pair of line cards, wherein each line card is a multi-port line card having a plurality of ports;
   means for coupling a first external device to a first port on the first multi-port line card and a corresponding first port on the second multi-port line card; and
   means for automatically enabling the first port of the first multi-port line card of the redundant pair to assume responsibility for reception of data from the first external device in the event of a failure to the corresponding first port of the second multi-port line card of the redundant pair;
   means for transmitting identical data over the pair of first connections from the first external device to the redundant multi-port line cards of the node
   means for coupling a second external device to a second port on the first multi-port line card and a corresponding second port on the second multi-port line card over a pair of second connections; and
   means for maintaining full redundant operation with the second external device despite the failure to one of the corresponding first port of the second multi-port line card of the redundant pair and its first connection to the first external device.

17. Apparatus for automatically reconfiguring ports on line cards of a router in the event of a failure to at least one of the ports, the apparatus comprising:
- means for organizing first and second line cards as a redundant pair of line cards, wherein each line card is a multi-port line card having a plurality of ports;
- means for coupling a first external device to a first port on the first multi-port line card and a corresponding first port on the second multi-port line card; and
- means for automatically enabling the first port of the first multi-port line card of the redundant pair to assume responsibility for reception of data from the first external device in the event of a failure to the corresponding first port of the second multi-port line card of the redundant pair;
- means for coupling a second external device to a second port on the first multi-port line card and a corresponding second port on the second multi-port line card;
- means for coupling a third external device to a third port on the first multi-port line card and a corresponding third port on the second multi-port line card; and
- means for maintaining full redundant operation with the second and third external devices despite the failure to the corresponding first port of the second multi-port line card of the redundant pair.

18. A computer readable medium containing executable program instructions for automatically reconfiguring ports on line cards of an aggregation router in the event of a failure to at least one of the ports, the executable program instructions comprising program instructions for:
- organizing first and second line cards as a redundant pair of line cards, wherein each line card is a multi-port line card having a plurality of ports;
- coupling a first external device to a first port on the first multi-port line card and a corresponding first port on the second multi-port line card over a pair of first connections; and
- automatically enabling the first port of the first multi-port line card of the redundant pair to assume responsibility for reception of data from the first external device in the event of a failure to one of the corresponding first port of the second multi-port line card of the redundant pair and its first connection to the first external device;
- transmitting identical data over the pair of first connections from the first external device to the redundant multi-port line cards of the aggregation router.

19. A computer readable medium containing executable program instructions for automatically reconfiguring ports on line cards of an intermediate network node in the event of a failure to at least one of the ports, the executable program instructions comprising program instructions for:
- organizing first and second line cards as a redundant pair of line cards, wherein each line card is a multi-port line card having a plurality of ports;
- coupling a first external device to a first port on the first multi-port line card and a corresponding first port on the second multi-port line card over a pair of first connections;
- automatically enabling the first port of the first multi-port line card of the redundant pair to assume responsibility for reception of data from the first external device in the event of a failure to one of the corresponding first port of the second multi-port line card of the redundant pair and its first connection to the first external device;
- coupling a second external device to a second port on the first multi-port line card and a corresponding second port on the second multi-port line card over a pair of second connections; and
- maintaining full redundant operation with the second external device despite the failure to one of the corresponding first port of the second multi-port line card of the redundant pair and its first connection to the first external device.

20. A multi-port line card redundancy circuit adapted to automatically reconfigure ports on first and second redundant line cards of a router in the event of a failure to one of the ports, the multi-port line card redundancy circuit comprising:
- a driver adapted to drive data provided by an end node directly to a port of the first redundant line card from the port to a corresponding port of the second redundant line card, where the end node provides identical data to first and second line cards over a pair of connections;
- a first multiplexer of the corresponding port, the first multiplexer having a first input configured to receive data driven by the driver to the corresponding port and a second input configured to receive data provided by the end node directly to the corresponding port of the second line card; and
- a microprocessor adapted to configure the multiplexer to select the data driven by the driver to the corresponding port in the event of the failure to the port of the first line card.

* * * * *